US009724986B2

(12) United States Patent
Gabel et al.

(10) Patent No.: US 9,724,986 B2
(45) Date of Patent: Aug. 8, 2017

(54) METHOD AND DEVICE FOR APPLYING ADHESIVE-BACKED WEATHERSTRIP

(71) Applicant: 3M INNOVATIVE PROPERTIES COMPANY, St. Paul, MN (US)

(72) Inventors: Mark R. Gabel, Cottage Grove, MN (US); Benjamin D. Belknap, Northville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/647,276

(22) PCT Filed: Nov. 26, 2013

(86) PCT No.: PCT/US2013/071904
§ 371 (c)(1),
(2) Date: May 26, 2015

(87) PCT Pub. No.: WO2014/085401
PCT Pub. Date: Jun. 5, 2014

(65) Prior Publication Data
US 2015/0306945 A1    Oct. 29, 2015

Related U.S. Application Data

(60) Provisional application No. 61/731,388, filed on Nov. 29, 2012.

(51) Int. Cl.
*E06B 7/16* (2006.01)
*B62D 65/08* (2006.01)
(Continued)

(52) U.S. Cl.
CPC ......... *B60J 10/0088* (2013.01); *B23P 19/047* (2013.01); *B25B 27/0092* (2013.01);
(Continued)

(58) Field of Classification Search
CPC ........ B60J 10/0088; B60J 10/80; B60J 10/34; B60J 10/45; B23P 19/047; B65H 37/005; B25B 27/0092
See application file for complete search history.

(56) References Cited

U.S. PATENT DOCUMENTS 4,876,132 A * 10/1989 Kunert ................ B29C 47/0014
156/108
7,055,228 B2    6/2006 Thommes et al.
(Continued)

FOREIGN PATENT DOCUMENTS

DE    CA 2450951 A1 * 10/2002 ......... B29C 66/4722
DE    10138781 A1    2/2003
(Continued)

OTHER PUBLICATIONS

International Search Report for PCT International Application No. PCT/US2013/071904 mailed on Feb. 17, 2014, 3 pages.

*Primary Examiner* — Jerry Redman
(74) *Attorney, Agent, or Firm* — Philip Y. Dahl; Harold Knecht, III

(57) ABSTRACT

A device for applying an adhesive-backed elongated seal (e.g., a weatherstrip seal) to a surface of a substrate. The device comprises a release liner removal tool having a stripper portion. The stripper portion comprises a spacer and a release liner guide surface. The spacer has a leading edge, an angled trailing edge, a central axis and a thickness profile that separates the adhesive on the back of the seal from the substrate surface while allowing the body of the seal to contact the substrate surface, when the stripper portion is positioned between the seal and the surface. The angled trailing edge has a transverse radius of curvature allowing the release liner to be removed from the adhesive, bent-backwards-over the trailing edge, and pulled-off along a portion of the guide surface, while the seal is adhered along its length to the surface.

20 Claims, 8 Drawing Sheets

(51) Int. Cl.
   *B25B 27/00* (2006.01)
   *B65H 37/00* (2006.01)
   *B23P 19/04* (2006.01)
   *B60J 10/34* (2016.01)
   *B60J 10/00* (2016.01)
   *B60J 10/80* (2016.01)

(52) U.S. Cl.
   CPC ............. *B60J 10/34* (2016.02); *B60J 10/45* (2016.02); *B60J 10/80* (2016.02); *B65H 37/005* (2013.01)

(56) References Cited

U.S. PATENT DOCUMENTS

| | | | | |
|---|---|---|---|---|
| 8,052,818 B2 * | 11/2011 | Fenger | ................ | B23P 19/047 156/160 |
| 8,649,903 B2 * | 2/2014 | Pleace | ................ | B23P 19/047 29/446 |
| 2005/0193544 A1 * | 9/2005 | Supina | ................ | B60J 10/45 29/450 |
| 2007/0267122 A1 * | 11/2007 | Anderson | ............ | B65H 37/005 156/60 |
| 2008/0216964 A1 * | 9/2008 | Degawa | ............... | B65H 37/005 156/538 |
| 2013/0153146 A1 * | 6/2013 | Paschmann | ........... | B23P 19/047 156/330.9 |
| 2014/0360675 A1 * | 12/2014 | Gonda | .................... | F16J 15/02 156/538 |
| 2015/0034228 A1 * | 2/2015 | Kast | .................... | B60J 10/0077 156/64 |
| 2015/0136329 A1 * | 5/2015 | Masecar | ............. | B65H 37/005 156/577 |

FOREIGN PATENT DOCUMENTS

| | | |
|---|---|---|
| DE | 102007033363 A1 * | 11/2008 |
| EP | 1813562 A1 * | 12/2006 |
| EP | 1873101 | 1/2008 |
| GB | 2133840 A | 8/1984 |
| WO | WO 2004/108459 | 12/2004 |
| WO | WO 2006/111489 A1 * | 10/2006 |
| WO | WO 2007/082915 | 7/2007 |

* cited by examiner

METHOD AND DEVICE FOR APPLYING ADHESIVE-BACKED WEATHERSTRIP

CROSS REFERENCE TO RELATED APPLICATIONS

This application is a national stage filing under 35 U.S.C. 371 of PCT/US2013/071904, filed Nov. 26, 2013, which claims the benefit of U.S. Provisional Application No. 61/731,388, filed Nov. 29, 2012, the disclosures of which are incorporated by reference in their entireties herein.

The present invention relates to methods and devices for applying adhesive-backed weatherstrip, in particular such methods and devices that include the use of a tool for removing a release liner while the adhesive-backed weatherstrip is applied to a substrate surface, and more particularly such methods and devices for applying adhesive-backed weatherstrip to body surfaces (e.g., doors and door frames) of a vehicle (e.g., an automobile, aircraft, or watercraft).

BACKGROUND

Rubber or other elastomeric profiles are known for making waterproof and/or airtight seals, for example, for use on automobile doors and refrigerator doors. Such elastomeric profiles are commonly provided in a closed-loop format, or of a discrete length, or in a continuous roll and often have at least one heat-formed or molded corner. Each elastomeric profile, or weatherstrip, is specifically designed and manufactured for each door type or each specific substrate to be sealed.

Commonly, the weatherstrips are attached to an opening to be sealed using mechanical interlocking techniques where the profile engages a groove or a lip in the door opening or on the door itself. Alternatively, the elastomeric profiles may be attached using other mechanical means such as pins. Elastomeric profiles may also be glued into place, and can be attached to a car door or door opening using pressure-sensitive adhesive tapes. Tapes especially suited for adhering rubber or other elastomeric profiles used as seals in automotive door or trunk opening are available from 3M Company (3M Deutschland GmbH in Neuss, Germany) Examples include a dual functional adhesive tape with a heat-activated adhesive on one side for bonding to the elastomeric profiles and a tacky pressure-sensitive adhesive on the other side for adhering the taped elastomeric profiles to a door opening, or a tape including a pressure-sensitive adhesive on each. The particular tape selected depends on the substrates to which the elastomeric profile is to be bonded.

Robotic end effector tooling is known for mechanically installing a closed-loop of weatherstrip to a lip surrounding a vehicle opening. One such device is taught in the published PCT application WO 2004/108459. One examples of such a device comprises means for feeding the weatherstrip to the end effector, a plurality of guide rollers to form the length of weatherstrip into a loop, and a plurality of arms for pressing the weatherstrip onto a lip of an opening. End effector tooling, or applicator heads, have also been disclosed that facilitate installation of adhesive based weatherstripping to a vehicle opening.

SUMMARY OF THE INVENTION

A major hurdle in using an adhesive (e.g., a double-sided adhesive tape) to bond weatherstrip seals in place can be the premature adhesion of exposed adhesive to the substrate surface (e.g., the surface of a vehicle part) before the weatherstrip is located in its final position. The invention described herein allows the seal to be located in its final position before the release liner is removed from the layer of adhesive. In order to do this, the invention rides along the release liner, creates a very small opening or gap between the weatherstrip and the surface of the substrate (e.g., a vehicle door, door frame, sun roof, sun roof frame, window, window frame, trunk lid, trunk frame, hood, hood frame, etc.) that allows the release liner to be removed at an angle (e.g., 90 degrees plus or minus about 60 degrees) to the direction the layer of adhesive is running along the back of the weatherstrip and to guide the removed release liner away from the weatherstrip. In this way the newly exposed layer of adhesive can be brought into contact with the substrate surface and bonded to the desired location on the substrate surface. The device of the present invention can also control the removal of the release liner so as to prevent the release liner from being pulled too early or too late during the weatherstrip application process.

In one aspect of the present invention, a device is provided for applying adhesive-backed weatherstrip to a substrate surface. The weatherstrip comprises a weatherstrip body backed by a layer of adhesive that is protected by a release liner. The device comprises a release liner removal tool having a stripper portion. The stripper portion comprises a weatherstrip spacer and a release liner guide surface. The weatherstrip spacer has a leading edge, an angled trailing edge, a central axis and a thickness profile. The thickness profile is operatively adapted to separate the weatherstrip adhesive from the substrate surface while allowing the weatherstrip body to contact the substrate surface, when the stripper portion is positioned between the weatherstrip and the substrate surface. The angled trailing edge has a longitudinal axis defining an obtuse angle with the central axis of the weatherstrip spacer. The angled trailing edge also has a transverse radius of curvature operatively adapted to allow a trailing length of the release liner to be removed from the layer of adhesive, bent-backwards-over the trailing edge and onto at least a portion of the release liner guide surface, after the weatherstrip spacer is positioned behind a corresponding portion of the attached release liner of the weatherstrip.

These and other aspects, features and/or advantages of the invention are further shown and described in the drawings and detailed description herein, where like reference numerals are used to represent similar parts. It is to be understood, however, that the drawings and description are for illustration purposes only and should not be read in a manner that would unduly limit the scope of this invention.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF CERTAIN EMBODIMENTS

Figure 1:
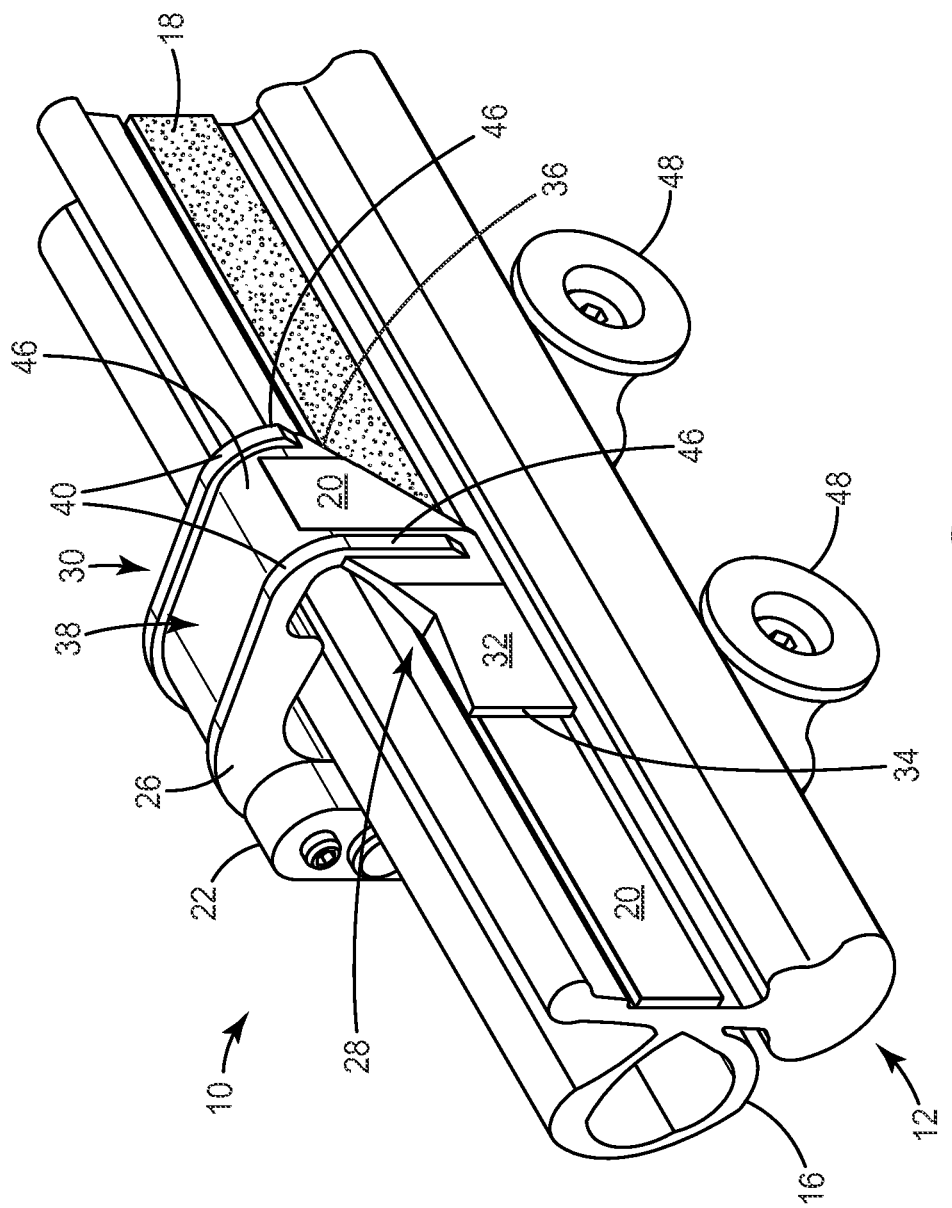
FIG. 1 is a slightly elevated rear perspective view of a release liner removal tool according to one embodiment of the present invention, with a length of exemplary weatherstrip disposed therein and showing a length of release liner removed and a corresponding length of adhesive tape exposed according to the present invention.
Figure 2:
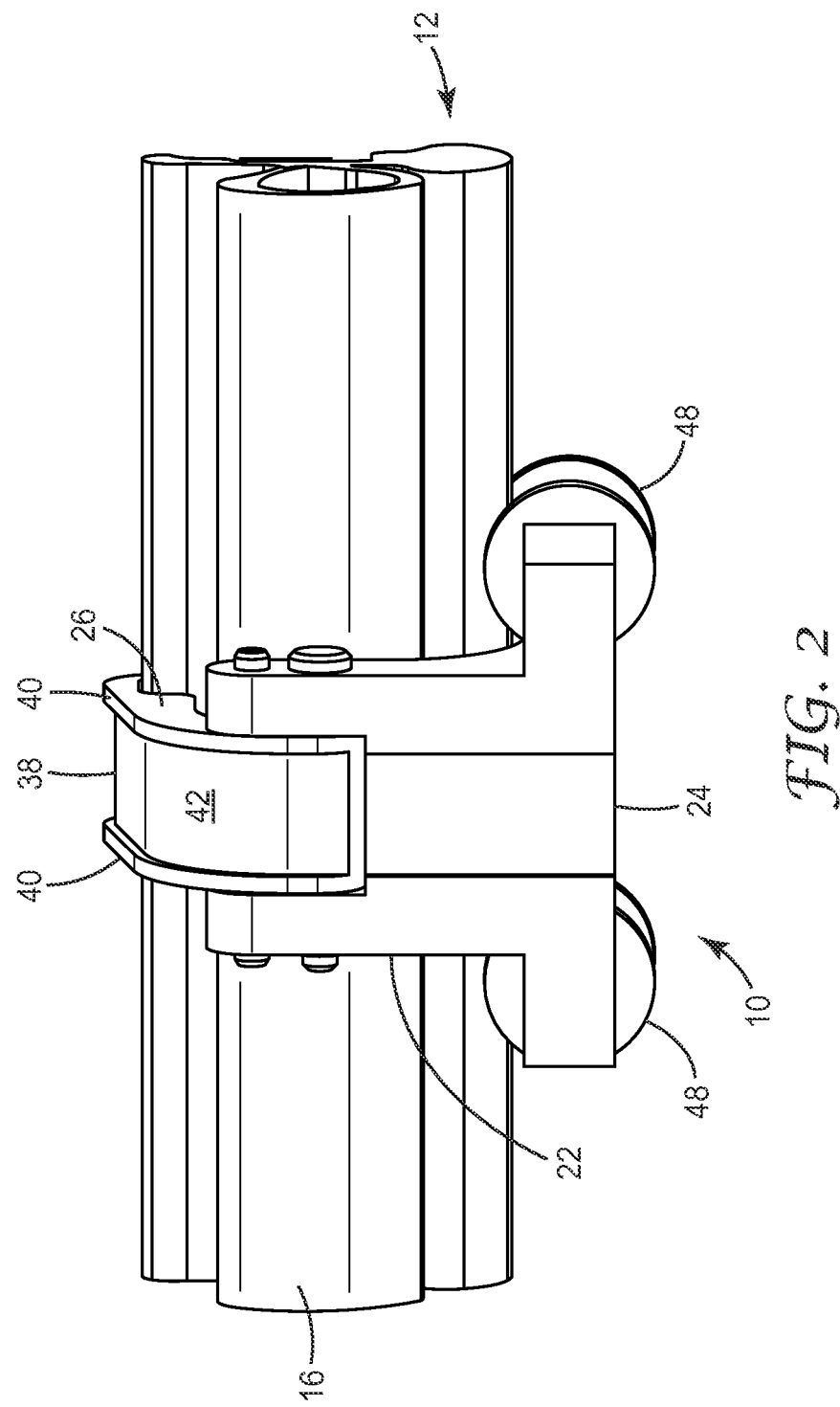
FIG. 2 is a front slightly perspective view of the release liner removal tool of FIG. 1.
Figure 3:
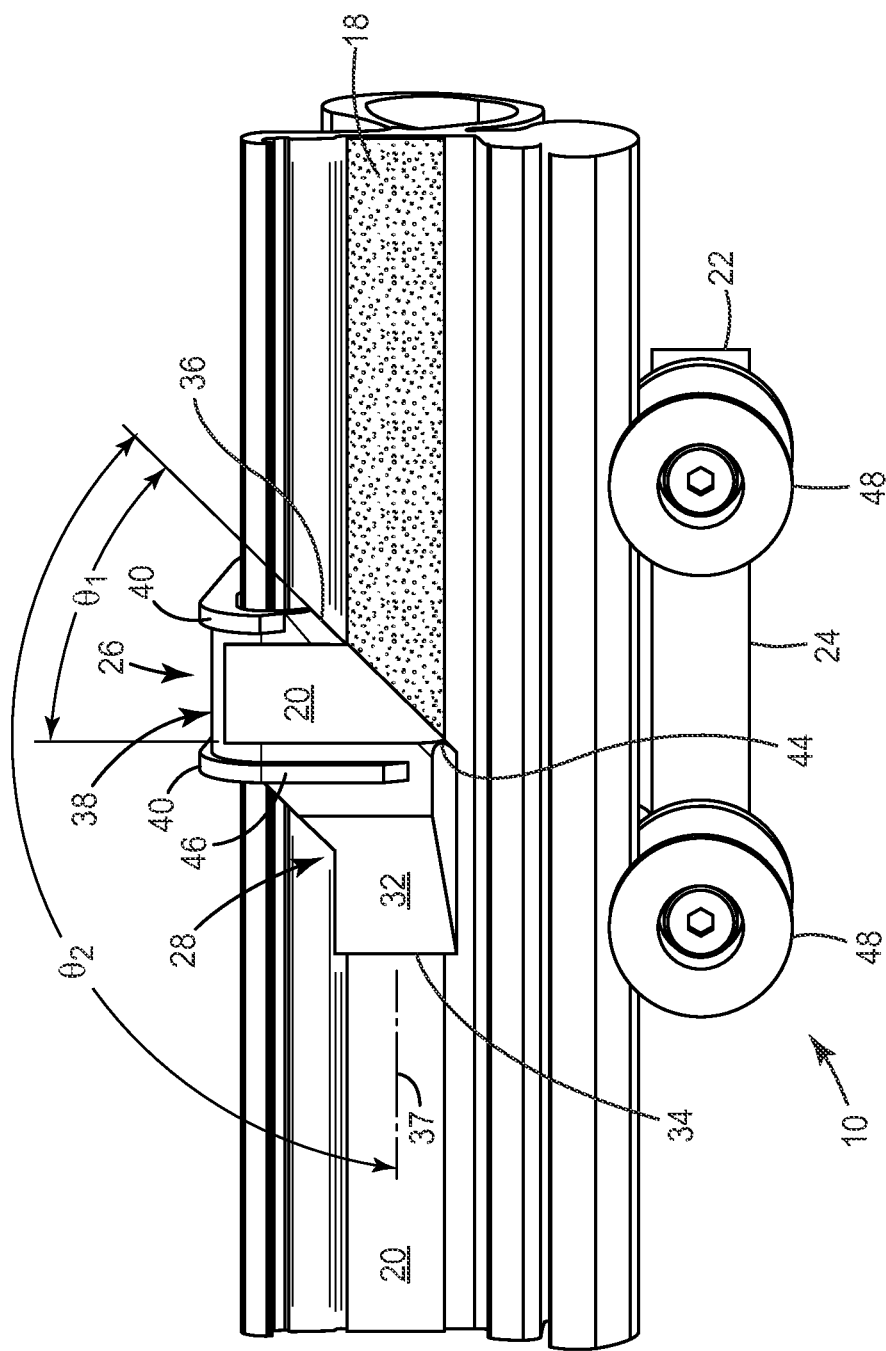
FIG. 3 is a rear slightly perspective view of the release liner removal tool of FIG. 2.
Figure 4:
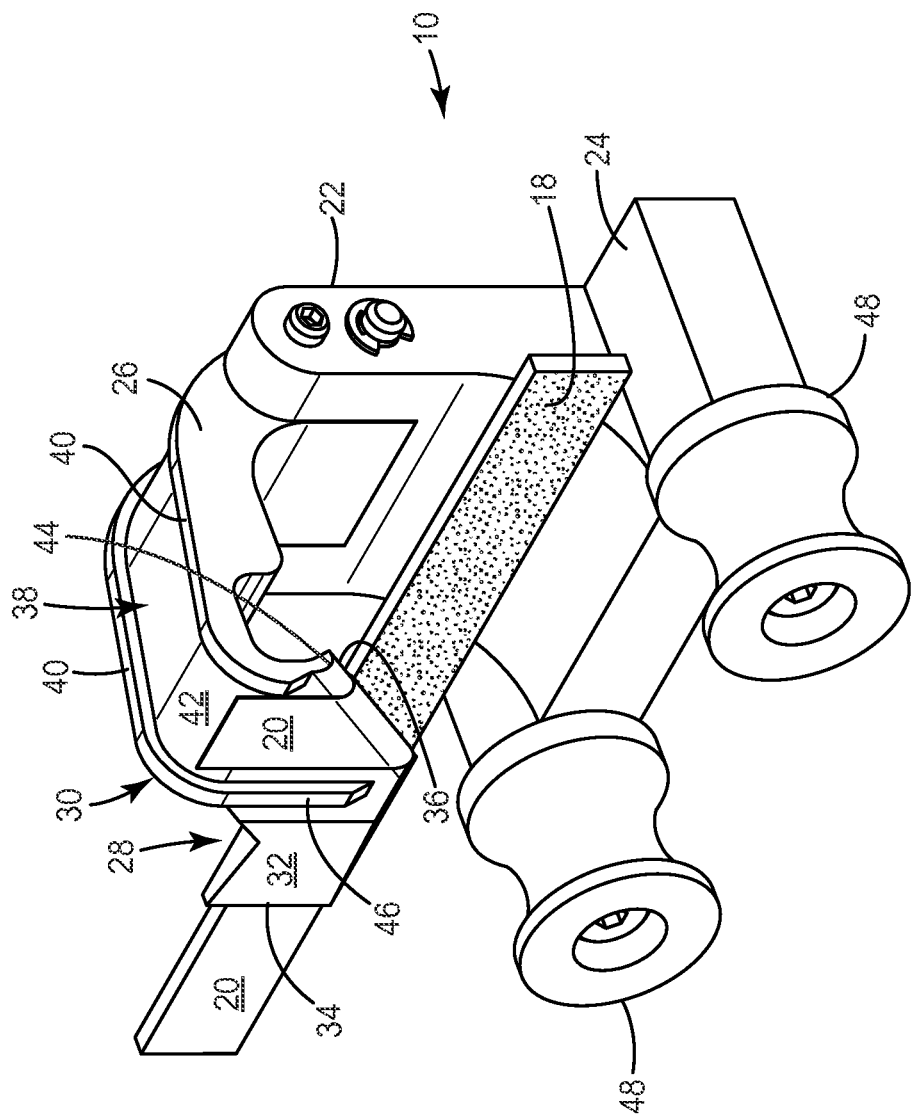
FIG. 4 is a rear perspective view of the release liner removal tool of FIG. 3, showing the adhesive tape and release liner without the weatherstrip.

In describing embodiments of the invention, specific terminology may be used for the sake of clarity and the same reference numbers may be used to describe similar structures. The invention, however, is not intended to be limited to the specific terms or structures so selected, and each term or structure so selected includes all technical equivalents that operate similarly.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

Referring to FIGS. 1-4, one embodiment of the present invention is directed to a weatherstrip applicator or application device 10, for applying an adhesive-backed weatherstrip 12 to a surface of a substrate 14 (e.g., a vehicle door frame, door, window frame, window, trunk frame, trunk, hood frame, and hood). The weatherstrip 12 has a weatherstrip body 16 backed by a layer of adhesive 18 (e.g., an adhesive tape such as a acrylic foam attachment tape sold by 3M Company) that is protected by a release liner 20. The device 10 includes a release liner removal tool 22 having a tool base 24, and a stripper portion 26 operatively adapted (i.e., designed, dimensioned and configured) for being disposed between the release liner 20 of the weatherstrip adhesive 18 and the substrate 14 on which the layer of adhesive 18 is to be bonded.

Figure 5:
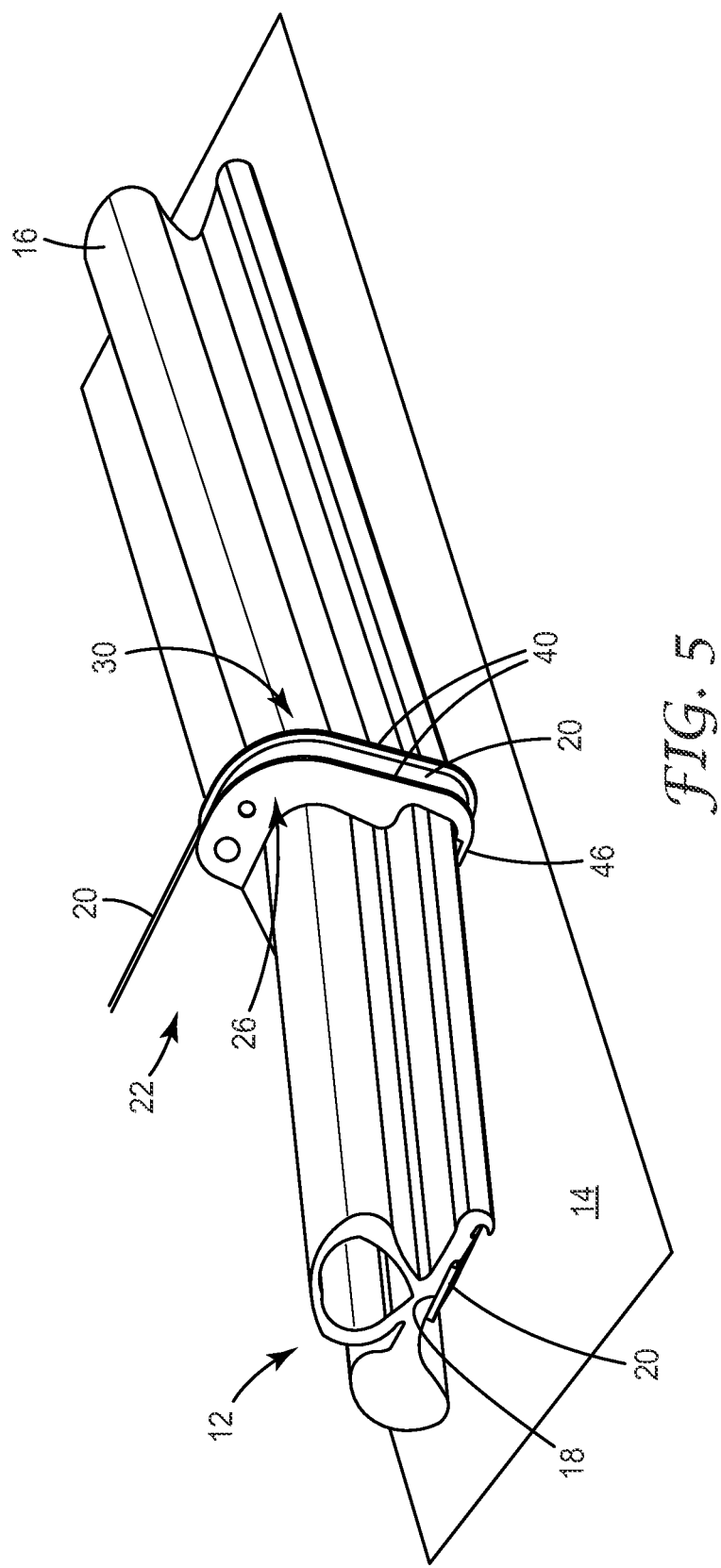
FIG. 5 is a perspective view of only the stripper portion of the release liner removal tool of FIG. 1 being used to apply an adhesive-backed weatherstrip to a substrate surface, according to the present invention.

As shown in FIG. 5, the stripper portion 26 of the release liner removal tool 22 can be used, by itself, to apply an adhesive-backed weatherstrip 12 to a substrate 14, The stripper portion 26 includes a weatherstrip spacer 28 and a release liner guide structure 30. The spacer 28 has an optional leading spacer lip 32, with a leading edge 34, an angled trailing edge 36, a central axis 37 running longitudinally along the length of the spacer 28 and generally in line with or parallel to the central longitudinal axis of the release liner 20 on the weatherstrip layer of adhesive or tape 18, and a wedge-shaped thickness profile that is operatively adapted (i.e., designed, dimensioned and configured) to separate a release liner protected portion of the weatherstrip adhesive 18 from the substrate 14 on which the layer of adhesive 18 is to be bonded while allowing the weatherstrip body 16 (e.g., at least one or both of the upper and lower edges of the weatherstrip body 16) to contact a portion of the substrate 14 located proximate or adjacent to the substrate surface on which the layer of adhesive 18 is to be bonded, when the stripper portion 26 is positioned between and in contact with both a corresponding portion of the attached release liner 20 of the weatherstrip 12 and the surface of the substrate 14 on which the layer of adhesive 18 is to be bonded. The release liner guide structure 30 can include a release liner guide channel 38 defined by opposite release liner guide rails 40 running laterally on either side of a release liner guide surface 42 forming the bottom of the guide channel 38.

The angled trailing edge 36 is operatively adapted (i.e., designed, dimensioned and configured) to allow a trailing length of the release liner 20 (i.e., a length of the release liner located immediately after or upstream of the trailing edge 36) to be removed from the layer of adhesive 18, bent-backwards-over the trailing edge 36 and onto at least a portion of the release liner guide surface 42, after the weatherstrip spacer 28 is positioned behind and in contact with a corresponding portion of the attached release liner 20 of the weatherstrip 12. For example, the angled trailing edge 36 can have a longitudinal axis defining an acute angle $\theta_1$ with the side edge of the release liner 20 removed from the weatherstrip 12 and disposed in the channel 38 (see FIG. 3). Alternatively, longitudinal axis of the angled trailing edge 36 can also be seen as defining an obtuse angle $\theta_2$ with the central longitudinal axis 37 of the weatherstrip spacer 28 (i.e., the axis running longitudinally along the length of the leading spacer lip 32). Preferably, the trailing edge 36 also has a transverse radius of curvature 44 that allows the removed trailing length of release liner 20 to bend somewhat gradually over the edge 36 and onto the guide surface 42. With this curvature 44, it can be easier to remove the liner 20. The weatherstrip application device 10, with the weatherstrip 12 captured therein, can then be positioned at the location on the substrate 14 where the layer of weatherstrip adhesive 18 is to be bonded (see FIG. 5).

The device 10 can also include at least one release liner gap spacer 46 on the stripper portion 26 (e.g., on one or both sides of the release liner guide surface 42 facing the substrate 14) for maintaining a gap between a portion of the release liner guide surface 42, facing the substrate 14 on which the layer of adhesive 18 is to be bonded, and a corresponding portion of the substrate surface 14 such that the release liner 20 can be easily pulled by hand or automatically through the gap, without adversely affecting the bonding of the weatherstrip 12 at the desired location on the substrate 14. It can be desirable for the gap to be comparable to or slightly larger than the thickness of the release liner 20. For example, the gap can be two or three times the thickness of the liner 20. The tool base 24 of the release liner removal tool 22 can also include at least one or more guide rollers 48, each operatively adapted (i.e., designed, dimensioned and configured), for example with a circumferential groove, for receiving so as to capture or otherwise controlling the lower edge of the weatherstrip body 16 therein. The length of weatherstrip 12 is secured in the tool 22 between the stripper portion 26 and the guide rollers 48. It can be desirable for the leading spacer lip 32 of the weatherstrip spacer 28 to have a wedge shaped thickness profile.

Figure 6:
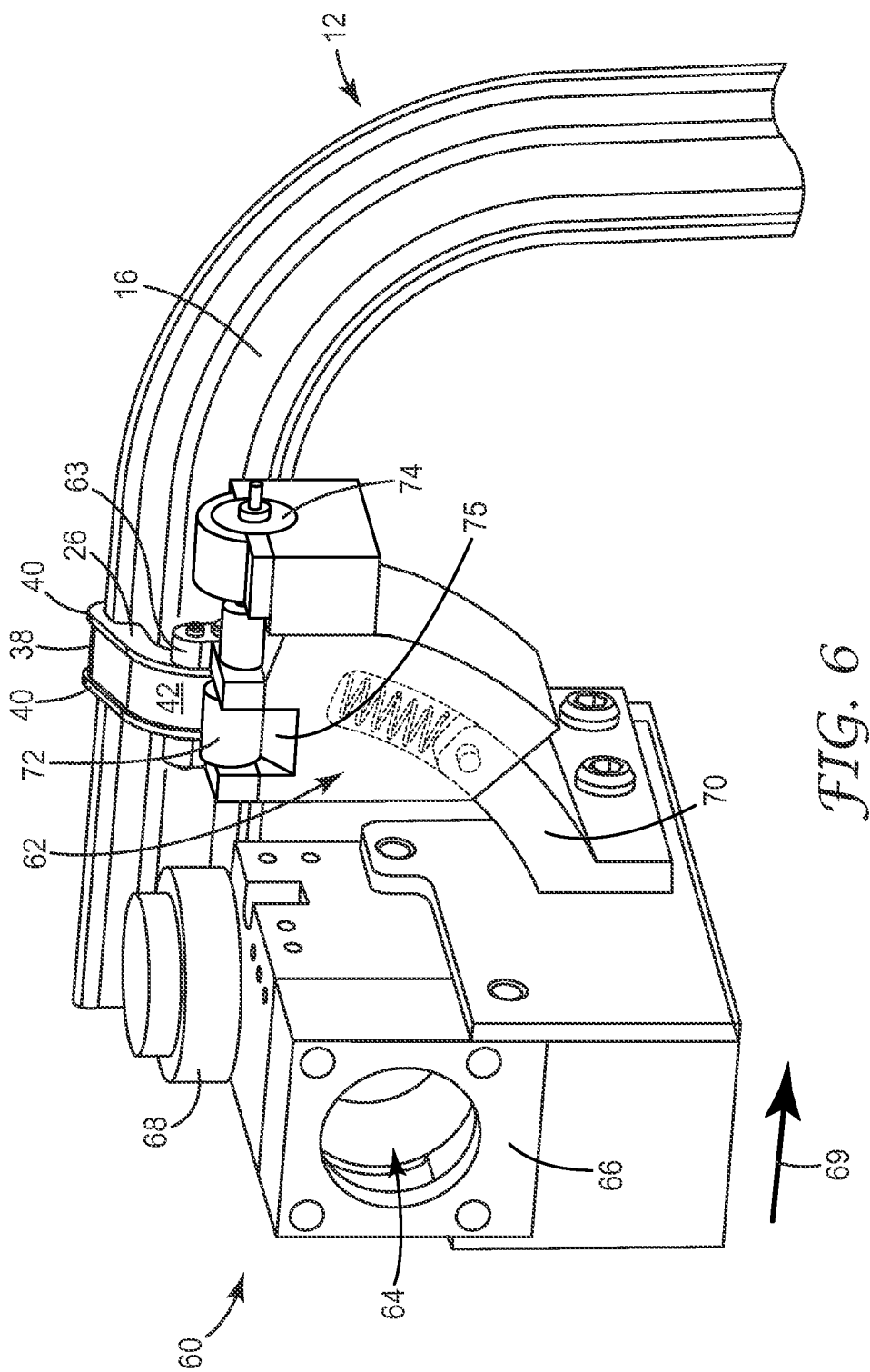
FIG. 6 is a front perspective view of a weatherstrip application device that includes a release liner removal tool similar to that shown in FIG. 1 for automatically applying an adhesive-backed weatherstrip according to another embodiment of the present invention, with a length of weatherstrip secured therein and an optional motor driven liner removal roller for automatically pulling the release liner off of the adhesive-backed weatherstrip.
Figure 7:
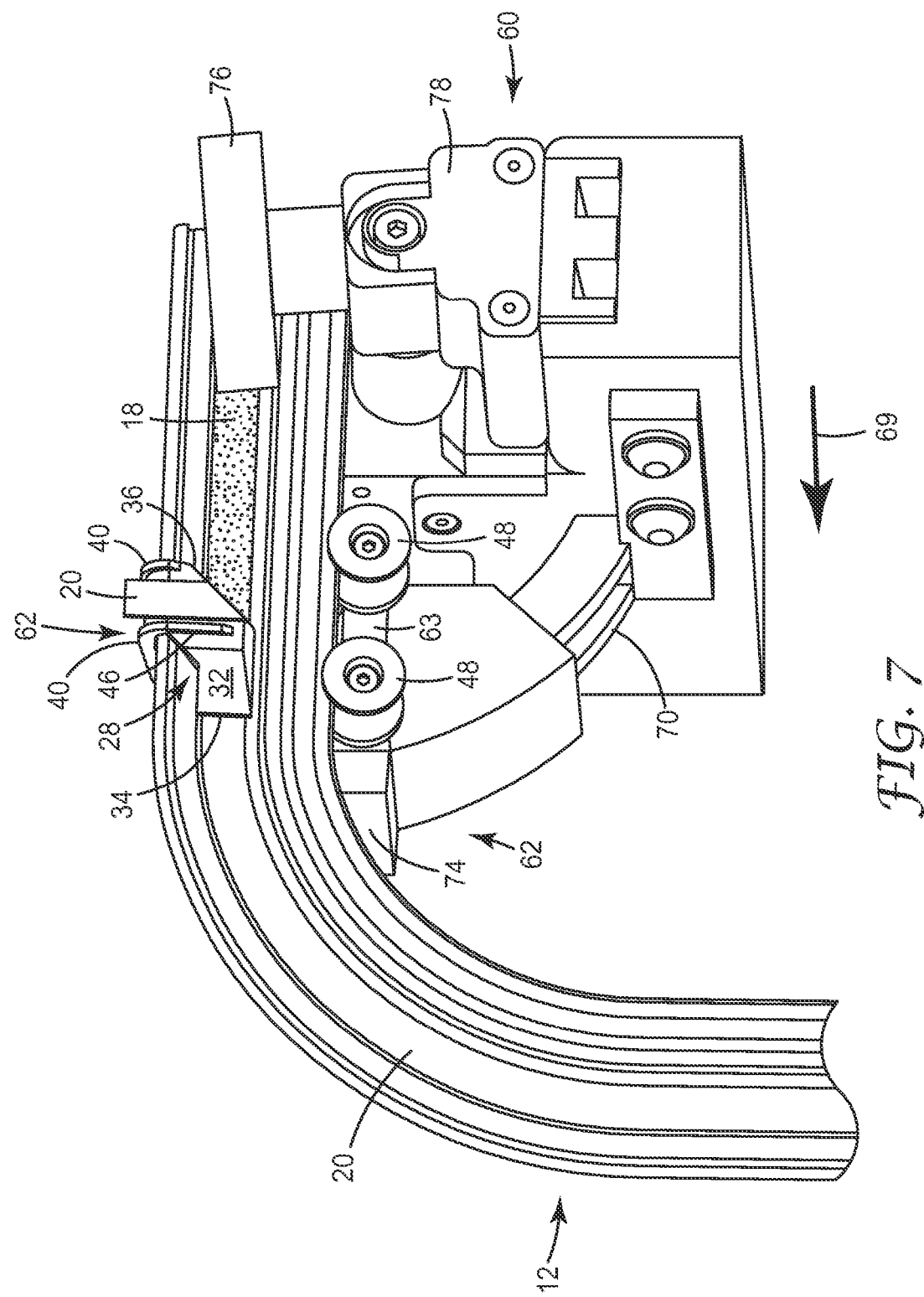
FIG. 7 is a rear perspective view of the weatherstrip application device of FIG. 6.

Referring to FIGS. 6 and 7, a weatherstrip application device 60, according to another embodiment, includes a release liner removal tool 62 similar to that shown in FIGS. 1-4, for automatically applying an adhesive-backed weatherstrip 12. The release liner removal tool 62 has a tool base 63, and a stripper portion 26 operatively adapted (i.e., designed, dimensioned and configured) for being disposed between the release liner 20 of the weatherstrip adhesive 18 and the substrate 14 on which the layer of adhesive 18 is to be bonded. The stripper portion 26 includes a weatherstrip spacer 28 and a release liner guide structure 30. The spacer 28 has an optional leading spacer lip 32, with a leading edge 34, an angled trailing edge 36. The release liner guide structure 30 can include a release liner guide channel 38 defined by opposite release liner guide rails 40 running laterally on either side of a release liner guide surface 42 forming the bottom of the guide channel 38. The stripper portion 26 includes at least one release liner gap spacer 46 (e.g., on one or both sides of the release liner guide surface 42 facing the substrate 14) for maintaining a gap between a portion of the release liner guide surface 42 and an opposite adjacent portion of the substrate surface 14 such that the release liner 20 can be easily pulled, by hand or mechanically, through the gap. The tool base 63 of the release liner removal tool 62 includes two guide rollers 48 for receiving so as to capture or otherwise controlling the lower edge of the weatherstrip body 16 therein. The weatherstrip spacer 28 can include a leading spacer lip 50 forming the leading edge 34, with the thickness profile of the weatherstrip spacer 28 being wedge-shaped.

The length of weatherstrip 12 is secured in the tool 62 between the stripper portion 26 and the guide rollers 48. A weatherstrip actuator motor (not shown) is mounted in a corresponding cavity 64 of a housing 66 for driving the rotation of at least one weatherstrip actuator roller 68, with each roller 68 being operatively adapted (i.e., designed, dimensioned and configured) to contact so as to advance the release liner removal tool 62 along the length of the weatherstrip body 16 in a direction of travel (shown by arrow 69), when the weatherstrip 12 is compressed so as to be frictionally engaged between the roller 68 and the substrate 14. The base 63 of tool 62 is spring loaded or otherwise biased on the end of a slide rail 70 and mounted so as to slide forward or backward along the rail 70, when forced to do so as the weatherstrip actuator roller 68 moves along the length of the weatherstrip body 16. The slide rail 70 is also mounted on the leading side of the housing 66 in front of the roller 68. The device 60 can include an optional liner removal or pulling roller 72 driven by a roller actuating motor 74, both mounted adjacent to the tool base 63 on the end of the slide rail 70. The removed release liner 20 is automatically pulled off of the adhesive-backed weatherstrip 12, when compressed or pinched so as to be frictionally engaged between the roller 72 and an adjacent portion of the liner guide surface 75 (partially hidden by roller 72) of the tool 62 and the roller 72 is rotated by actuating the motor 64.

The device 60 can also optionally include a weatherstrip nip roller 76 that rotates on a base 78 mounted to the housing 66. The roller 76 can be mounted with a biasing mechanism (e.g., a spring loaded mechanism) so that the rollers 72 and 76 can be forced apart enough to allow the weatherstrip 12 and the substrate 14, at least where the weatherstrip is to be bonded, to be disposed therebetween. In this way, the weatherstrip 12 and substrate 14 can also be compressed by this biasing action so as to be frictionally engaged between the rollers 72 and 76 such that the layer of adhesive 18 on the back of the weatherstrip 12 can be pressed against so as to adhere to the surface of the substrate 14. It can be desirable for either or both of the rollers 72 and 76 to be freely rotatable or directly rotated by an actuator motor.

Figure 8:
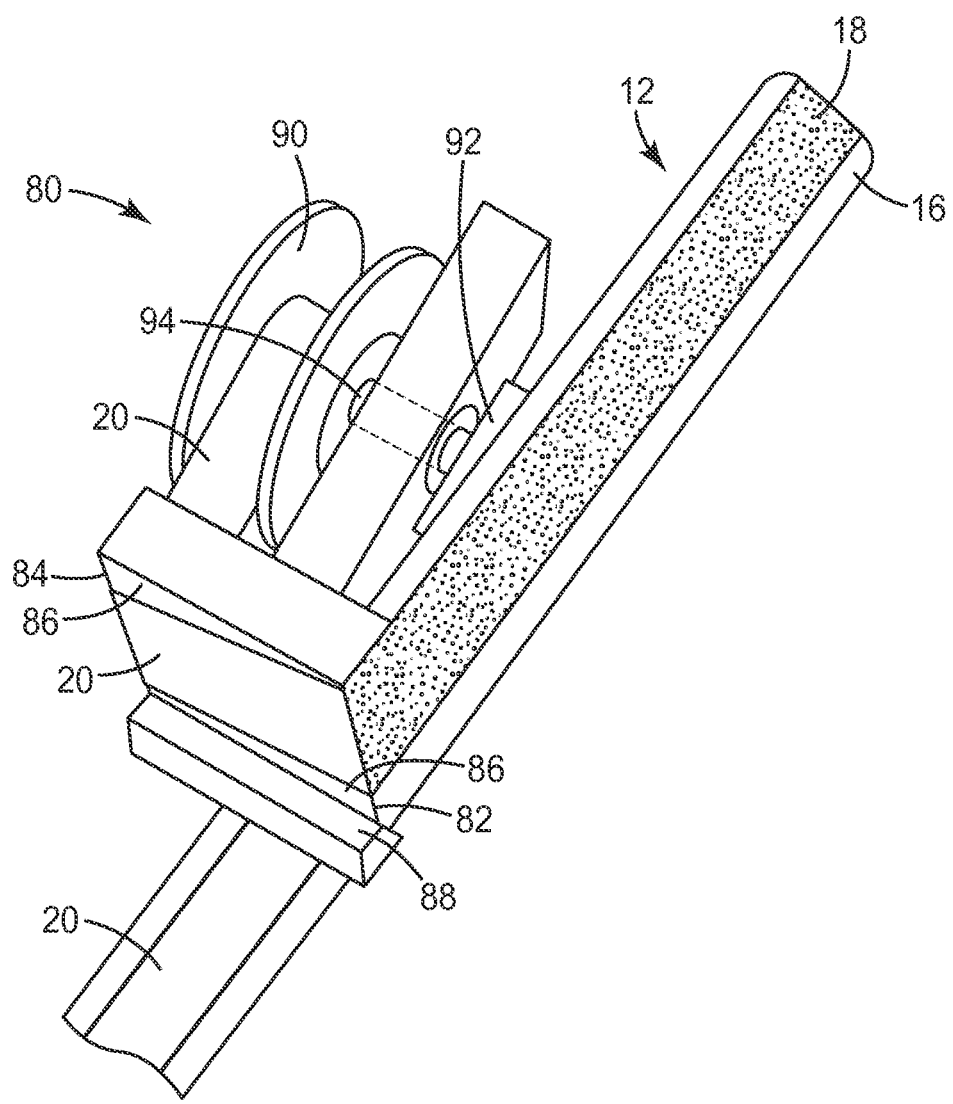
FIG. 8 is a rear perspective view of another release liner removal tool embodiment, with a liner pulling spool for automatically removing and rolling-up the release liner.

Referring to FIG. 8, an alternative release liner removal tool 80 includes initial angled trailing edge 82 and secondary angled trailing edge 84 (angled to a degree equal or similar to that of edge 82), a release liner guide surface 86 between the angled edges 82 and 84, and a weatherstrip spacer 88. The initial angled edge 82 is operatively adapted (i.e., designed, dimensioned and configured) to allow a trailing length of the release liner 20 (i.e., a length of the release liner located immediately after or upstream of the trailing edge 82) to be removed from the layer of adhesive 18, bent-backwards-over the trailing edge 82 and onto at least a portion of a release liner guide surface 86, after the weatherstrip spacer 28 is positioned behind and in contact with a corresponding portion of the attached release liner 20 of the weatherstrip 12. The trailing length of the removed release liner 20 is then bent-backwards-over the secondary angled edge 84 and wrapped around a spool 90 for rolling-up the liner 20. The spool 90 is connected, through a shared drive shaft or axel, so as to be rotable with a weatherstrip actuator roller 92. Thus, as the roller 92 engages and rotates along the length of the weatherstrip 12, the trailing length of the release liner 20 can be wound-up onto the spool 90. The roller 92 and the spool 90 are connected by an axil 94 using conventional means so that the winding of the liner 20 onto the spool 90 keeps pace with the movement of the roller 92 along the length of the weatherstrip 12.

Prior release liner removal devices require access to the adhesive tape release liner from the adhesive side. Often a pin or small roller or other device rides along the surface of the release liner and the liner is removed in a direction generally in-line with or parallel to the length of the tape. The present invention differs from prior liner removal devices, for example, by allowing the release liner to be removed from the adhesive tape in a direction other than down the length of the tape. It does not require open access to the adhesive tape release liner, only a small gap between the adhesive and the substrate. Changing the angle of the release liner as it is being removed can allow the liner to be removed out from under the weatherstrip with only a minimal gap being formed between the tape and the substrate surface. The angle of liner removal can be any angle that allows the liner to be removed without requiring the weatherstrip to be moved out of position. There could be multiple angles used to remove the release liner. The material and apparatus used to create the change of liner direction could be an angle machined into a material structure such as, e.g., plastic, metal, or other rigid or flexible structure. Also, a rotatable roller held at an angle or formed with an angular surface, or a stationary structural feature formed with an angular surface, could be used to change the direction of the release liner. It can be desirable for the portion of the release liner removal device that contacts the surface of the substrate, on which the weatherstrip is to be adhered, and/or that the release liner contacts to be made of a low friction material to reduce drag or frictional forces.

The release liner itself could be reinforced if required to prevent it from breaking or significantly stretching during the removal process. The inventive device could be used with a release liner made of a multitude of materials, including but not limited to: Poly-coated kraft paper, Kraft paper, Olefins, Polyester, and other plastic or paper release liner materials. The preference is usually for the gap between the weatherstrip and the substrate surface to be as small as possible, but this invention could also be used with a larger gap between the weatherstrip and the substrate or, in other words, with the weatherstrip not being in close proximity to the substrate. One of the benefits of this invention is that the weatherstrip can be in the proper position when the liner is removed and the adhesive is applied.

The locating of the weatherstrip could be performed by any one or any combination of: (a) Manually located and held in place by hand, (b) A manual application tool could position the weatherstrip during application directly prior to the liner being removed, (c) The weatherstrip could be clamped or taped in place, (d) The weatherstrip could be attached mechanically via pins or clips prior to the liner being removed, (e) A feature of the weatherstrip could hold it in the proper position after placement, (f) A fixture or template could position and/or hold the weatherstrip in place, (g) A semi-automated (assisted) application tool could position the weatherstrip during application directly prior to the liner being removed i.e. Rail system with tool, assist arm with tool, etc., (h) A robot could place or position the seal during application directly prior to the liner being removed, and (i) Other methods could be used to place and/or hold the weatherstrip prior to the liner being removed and the adhesive applied (e.g., pressure sensitive adhesive pressurized). The liner removal device can be positioned between the adhesive layer or tape and the substrate according to any one or any combination of the following ways: (a) It could be placed between the adhesive and the substrate either manually or automatically via machine or robot, (b) It could be fed between the adhesive and substrate from one end of the weatherstrip, (c) The weatherstrip could be loaded on top of the device which is already in position, and (d) Device could otherwise be positioned between the tape and the substrate. The device to keep tension on the liner during application could be any one or any combination of: (a) Manual tension—pulled by hand, (b) Driven nip rollers or belts or other method to grab the liner, (c) Vacuum system to pull the liner, (d) Weighted roller, (e) Over-driven rollers with slip-clutch attached to rollers or belts, (f) Constant torque motor attached to rollers or belts, and (g) Other device to keep tension on liner during application. The removed liner could be removed via a vacuum tube. It could be cut into pieces or removed as one piece.

Efforts have been underway to sell adhesive tape products to bond weatherstrip primary seals into, for example, automobile bodies and around doors. Using tools to apply such adhesive backed weatherstrip can be problematic, because the seal can easily be bonded in the wrong place if the liner is removed, exposing the adhesive, before the seal is located in its final position. A way to overcome this is to first locate the seal and then remove the liner. The technical problem with doing this is that the liner is trapped between the seal and the vehicle flange. This invention creates a small space in this interface and guides the liner out. Further, and more importantly, the geometry of this device turns the tension used to pull the liner into optimum forces to peel the liner away from the adhesive. Without it, simply pulling on the liner will generally cause the liner to fail because so much tension is required to overcome associated frictional forces. Also, the liner must be pulled at some variable forward angle so it cannot be pulled in an automated fashion. It has been found that the closer the liner is pulled at a 90 degree angle from the central longitudinal axis of the adhesive tape the easier it is to remove the liner using an automated process. Controlling the precise point where the liner is removed during application can also be a challenge. If the liner is removed to soon or too late during application, it can result in a weatherstrip that is applied in the wrong position or can cause the liner to be pinched under the tape. If the liner becomes pinched, then the liner cannot be removed and the process cannot be completed. This invention can also control the exact location where the liner is removed during the application process. The liner is removed at the point where the device comes in contact with the liner.

Exemplary Embodiments

Device Embodiments

1. An applicator or application device for applying an adhesive-backed seal to a substrate surface (e.g., a weatherstrip seal or other elongated seal like that used to seal a door, window, trunk, hood, lid, etc. of a vehicle, appliance, etc.), where the seal (e.g., weatherstrip) comprises an elongated seal body (e.g., a weatherstrip body) that has a high length to width aspect ratio and is backed by a layer of adhesive (e.g., an adhesive tape such as an acrylic foam attachment tape sold by 3M Company) that is protected by a release liner. The device comprises a release liner removal tool having a tool base, and a stripper portion operatively adapted (i.e., designed, dimensioned and configured) for being disposed between the release liner of the weatherstrip and the substrate surface on which the layer of adhesive is to be bonded, the stripper portion comprising:

a spacer having a leading spacer lip, with a leading edge, an angled trailing edge, a central axis running longitudinally along the length of the spacer and generally in line with or parallel to the central longitudinal axis of the release liner on the layer of adhesive, and a wedge-shaped thickness profile that is operatively adapted (i.e., designed, dimensioned and configured) to separate a release liner protected portion of the weatherstrip adhesive from the substrate surface on which the layer of adhesive is to be bonded while allowing the seal body (e.g., at least one or both of the upper and lower edges of a weatherstrip body) to contact a portion of the substrate surface located proximate or adjacent to the surface of the substrate on which the layer of adhesive is to be bonded, when the stripper portion is positioned between and in contact with both a corresponding portion of the attached release liner of the adhesive backed seal (e.g., weatherstrip) and the substrate surface on which the layer of adhesive is to be bonded; and a release liner guide structure comprising a release liner guide channel defined by opposite release liner guide rails running laterally on either side of a release liner guide surface forming the bottom of the guide channel, wherein the angled trailing edge has a longitudinal axis defining an obtuse angle θ with the central axis of the spacer (e.g., an axis running longitudinally along the length of the optional leading spacer lip), and a transverse radius of curvature operatively adapted (i.e., designed, dimensioned and configured) to allow a trailing length of the release liner (i.e., a length of the release liner located immediately after or upstream of the trailing edge) to be removed from the layer of adhesive, bent-backwards-over the trailing edge and onto at least a portion of the release liner guide surface, after the weatherstrip spacer is positioned behind and in contact with a corresponding portion of the attached release liner of the adhesive-backed seal (e.g., weatherstrip). The seal application device, with the seal (e.g., weatherstrip) captured therein, can then be positioned on the substrate surface location where the layer of adhesive is to be bonded.

2. The device according to embodiment 1 further comprising:
at least one release liner gap spacer on the stripper portion (e.g., on one or both sides of the release liner guide surface facing the substrate surface) for maintaining a gap, larger than the thickness of the release liner, between a portion of the release liner guide surface facing the substrate surface on which the layer of adhesive is to be bonded and a corresponding portion of the substrate surface such that the release liner can be easily pulled, by hand or mechanically, through the gap without adversely affecting the bonding of the weatherstrip at the desired location on the substrate surface. The following embodiments shall hereafter be described relative to its use with a weatherstrip seal. It is understood, however, that these embodiments can be equally suitable for any such elongated seal and not just weatherstrip seals.

3. The device according to embodiment 1 or 2, wherein the release liner removal tool further comprises a tool base with at least one or more guide rollers, each operatively adapted (i.e., designed, dimensioned and configured), for example with a circumferential groove, for receiving so as to capture or otherwise controlling the lower edge of the weatherstrip body therein.

4. The device according to any one of embodiments 1 to 3, wherein the central axis runs longitudinally along the length of the spacer.

5. The device according to any one of embodiments 1 to 4, wherein the weatherstrip spacer comprises a leading spacer lip forming the leading edge.

6. The device according to any one of embodiments 1 to 5, wherein the thickness profile of the weatherstrip spacer is wedge-shaped.

7. The device according to any one of embodiments 1 to 6, further comprising a release liner guide structure comprising a release liner guide channel defined by opposite release liner guide rails running laterally on either side of a portion of the release liner guide surface forming a bottom of the guide channel.

The weatherstrip can be captured within a weatherstrip receiving cavity defined by the stripper portion and tool base of the release liner removal tool. It can be desirable for the spacer leading edge to be relatively thin with, e.g., the leading edge of the spacer lip typically having a thickness in the range of from less than or equal to about 1 mm up to about 2 mm. It can be desirable for the angled trailing edge of the removal tool to be thicker than the leading edge of the spacer lip with, e.g., a thickness in the range of from greater than about 2 mm up to about 5 mm, or more. It can be desirable for the spacer lip to have a width comparable to that of the adhesive layer (i.e., slightly wider, the same width, or slightly narrower than the adhesive layer). It can also be desirable for central axis of the spacer lip to be parallel to, or at least generally aligned with, the central longitudinal axis of the adhesive layer. It can be desirable for the longitudinal axis of the angled trailing edge to define an obtuse angle θ with the central axis of the weatherstrip spacer in the range of from about 15 degrees up to about 85 degrees, in increments of about 2.5 degrees (i.e., 17.5°, 20°, 22.5°, 25°, 27.5°, 30°, 32.5°, 35°, 37.5°, 40°, 42.5°, 45°, 47.5°, 50°, 52.5°, 55°, 57.5°, 60°, 62.5°, 65°, 67.5°, 70°, 72.5°, 75°, 77.5°, 80°, and 82.5°), and any range therebetween.

8. The device according to any one of embodiments 1 to 7 further comprising:
at least one or more weatherstrip actuator rollers mounting or otherwise mounted to the release liner removal tool, each weatherstrip actuator roller being operatively adapted (i.e., designed, dimensioned and configured) to contact so as to advance the release liner removal tool along the length of the weatherstrip body.

9. The device according to embodiment 8 further comprising:
at least one or more weatherstrip actuator motors for driving the rotation of the at least one or more weatherstrip actuator rollers and thereby advance the release liner removal tool along the length of the weatherstrip body, and the at least one or more weatherstrip actuator motors mounting or otherwise being mounted to the release liner removal tool.

10. The device according to embodiment 8 or 9, further comprising:
a biased (e.g., spring loaded) slide rail connecting the release liner removal tool to the at least one or more weatherstrip actuator rollers such that the release liner removal tool can slide forward and backward along the slide rail, when forced to do so as the at least one or more weatherstrip actuator rollers move along the length of the weatherstrip body.

11. The device according to any one of embodiments 1 to 10, further comprising:
at least one or more weatherstrip nip rollers mounting or otherwise mounted to the at least one or more weatherstrip actuator rollers such that the weatherstrip and at least a desired portion of the substrate surface, on which the weatherstrip is to be adhered, can be disposed between the at least one or more weatherstrip actuator rollers and the at least one or more weatherstrip nip rollers such that the layer of adhesive on the back of the weatherstrip can be pressed against so as to adhere to at least the desired portion of the substrate surface. It can be desirable for each the weatherstrip actuator roller to be freely rotatable (e.g., not directly rotated by an actuator motor).

12. The device according to embodiment 11, further comprising:
a biasing mechanism (e.g., a spring loaded mechanism) for biasing the at least one or more weatherstrip nip rollers and the at least one or more weatherstrip actuator rollers toward one another, while allowing the at least one or more weatherstrip nip rollers and the at least one or more weatherstrip actuator rollers to be forced apart enough to allow the weatherstrip and at least the desired portion of the substrate surface to be disposed therebetween.

13. The device according to any one of embodiments 1 to 12, further comprising:
at least one or more release liner pulling rollers and at least one or more actuator motors for driving the at least one or more release liner pulling rollers so as to pull a trailing length of the release liner, which has been removed off of the layer of adhesive, over the angled trailing edge, across at least a portion of the release liner guide surface and away from the weatherstrip.

14. The device according to embodiment 13, wherein the at least one or more release liner pulling rollers frictionally engage the trailing length of the release liner.

15. The device according to embodiment 13, wherein the at least one or more release liner pulling rollers is a spool on which the trailing length of the release liner is wound up.

Combination Embodiments

16. A combination of the device according to any one of embodiments 1 to 15 and an adhesive-backed weatherstrip, with the weatherstrip comprising a layer of adhesive (e.g., an adhesive tape such as a acrylic foam attachment tape sold by 3M Company) attached to the back of a weatherstrip body, wherein the layer of adhesive is protected by a release liner attached thereto, and the stripper portion is operatively adapted (i.e., designed, dimensioned and configured) for being disposed between the attached release liner on the weatherstrip body and the substrate surface on which the layer of adhesive is to be bonded.

17. The combination according to embodiment 16, wherein the release liner on the layer of adhesive has a central longitudinal axis, and the central axis of the weatherstrip spacer runs generally in line with or parallel to the central longitudinal axis of the layer of adhesive.

Method Embodiments

18. A method of applying an adhesive-backed weatherstrip to a substrate surface using the device according to any one of embodiments 1 to 15.

19. A method of applying an adhesive-backed weatherstrip to a substrate surface using the combination according to embodiment 16 or 17.

This invention may take on various modifications and alterations without departing from its spirit and scope. Accordingly, this invention is not limited to the above-described but is to be controlled by the limitations set forth in the following claims and any equivalents thereof.

This invention could be used when attaching any elongated seal (e.g., a length of weatherstrip) or other such structure that is attached using attachment tape or other adhesive that has a release liner protecting the surface of the adhesive. Examples of such elongated structures, other than weatherstrip seals (rubber-based seals, usually EPDM, TPV, or TPE), may include Rigid or flexible adhesive-backed elongated plastic parts—trim components such as body side moldings, bright strips, etc., and may also include Metal parts, e.g., in the form of thin strips. It could be used in any industry that has tape-attached components and is not limited to just automotive weatherstrip seal attachment.

This invention may be suitably practiced in the absence of any element not specifically disclosed herein.

All patents and patent applications cited above, including those in the Background section, are incorporated by reference into this document in total.

What is claimed is:

1. A device for applying an adhesive-backed weatherstrip to a substrate surface, where the weatherstrip comprises a weatherstrip body having a length and backed by a layer of adhesive that is protected by a release liner, said device comprising a release liner removal tool having a stripper portion comprising:
a weatherstrip spacer having a length, a leading edge, an angled trailing edge, a central axis and a thickness profile that is operatively adapted to separate the weatherstrip adhesive from the substrate surface while allowing the weatherstrip body to contact the substrate surface, when said stripper portion is positioned between the weatherstrip and the substrate surface; and
a release liner guide surface,
wherein said angled trailing edge has a longitudinal axis defining an obtuse angle with the central axis of said weatherstrip spacer, and a transverse radius of curvature operatively adapted to allow a trailing length of the release liner to be removed from the layer of adhesive, bent-backwards-over said trailing edge and onto at least a portion of said release liner guide surface, after said weatherstrip spacer is positioned behind a corresponding portion of the attached release liner of the weatherstrip.

2. The device according to claim 1 further comprising:
at least one release liner gap spacer for maintaining a gap between a portion of the release liner guide surface facing the substrate surface and a corresponding portion of the substrate surface such that the release liner can be easily pulled through the gap.

3. The device according to claim 1, wherein said release liner removal tool further comprises a tool base with at least one guide roller operatively adapted for controlling the lower edge of the weatherstrip body.

4. The device according to claim 1, wherein said central axis runs longitudinally along the length of said spacer.

5. The device according to claim 1, wherein said weatherstrip spacer comprises a leading spacer lip forming said leading edge.

6. The device according to claim 1, wherein the thickness profile of said weatherstrip spacer is wedge-shaped.

7. The device according to claim 1, further comprising a release liner guide structure comprising a release liner guide channel defined by opposite release liner guide rails running laterally on either side of a portion of said release liner guide surface forming a bottom of said guide channel.

8. The device according to claim 1 further comprising:
at least one weatherstrip actuator roller mounted to said release liner removal tool, each said weatherstrip actuator roller being operatively adapted to contact so as to advance said release liner removal tool along the length of the weatherstrip body.

9. The device according to claim 8 further comprising:
at least one weatherstrip actuator motor for driving the rotation of said at least one weatherstrip actuator roller and thereby advance said release liner removal tool along the length of the weatherstrip body, and said at least one weatherstrip actuator motor being mounted to said release liner removal tool.

10. The device according to claim 8, further comprising:
a biased slide rail connecting said release liner removal tool to said at least one weatherstrip actuator roller such that said release liner removal tool can slide forward and backward along said slide rail, when forced to do so as said at least one weatherstrip actuator roller moves along the length of the weatherstrip body.

11. The device according to claim 1, further comprising:
at least one weatherstrip nip roller mounted to said at least one weatherstrip actuator roller such that the weatherstrip and at least a desired portion of the substrate surface can be disposed between said at least one weatherstrip actuator roller and said at least one weatherstrip nip roller such that the layer of adhesive on the back of the weatherstrip can be pressed against so as to adhere to at least the desired portion of the substrate surface.

12. The device according to claim 11, further comprising:
a biasing mechanism for biasing said at least one weatherstrip nip roller and said at least one weatherstrip actuator roller toward one another, while allowing said at least one weatherstrip nip roller and said at least one weatherstrip actuator roller to be forced apart enough to allow the weatherstrip and at least the desired portion of the substrate surface to be disposed therebetween.

13. The device according to claim 1, further comprising:
at least one release liner pulling roller and at least one actuator motor for driving said at least one release liner pulling roller so as to pull a trailing length of the release liner over said angled trailing edge, across at least a portion of said release liner guide surface and away from the weatherstrip.

14. The device according to claim 13, wherein said at least one release liner pulling roller frictionally engages the trailing length of the release liner.

15. The device according to claim 13, wherein said at least one release liner pulling roller is a spool on which the trailing length of the release liner is wound up.

16. A combination of said device according to claim 1 and an adhesive-backed weatherstrip, with said weatherstrip comprising a layer of adhesive attached to the back of a weatherstrip body, wherein the layer of adhesive is protected by a release liner attached thereto, and said stripper portion is operatively adapted for being disposed between the attached release liner on said weatherstrip body and the substrate surface on which said layer of adhesive is to be bonded.

17. The combination according to claim 16, wherein said release liner on said layer of adhesive has a central longitudinal axis, and the central axis of said weatherstrip spacer runs generally in line with or parallel to the central longitudinal axis of said layer of adhesive.

18. A method of applying an adhesive-backed weatherstrip to a substrate surface using the device according to claim 1.

19. A substrate having a surface, with an adhesive-backed weatherstrip applied to the substrate surface according to the method of claim 18, with the substrate surface being a body surface of a vehicle.

20. The substrate according to claim 19, wherein the substrate is a door of the vehicle.

\* \* \* \* \*